United States Patent
Wang et al.

(10) Patent No.: US 6,343,476 B1
(45) Date of Patent: *Feb. 5, 2002

(54) GAS STORAGE AND DISPENSING SYSTEM COMPRISING REGULATOR INTERIORLY DISPOSED IN FLUID CONTAINMENT VESSEL AND ADJUSTABLE IN SITU THEREIN

(75) Inventors: Luping Wang, Brookfield; Glenn M. Tom, New Milford, both of CT (US)

(73) Assignee: Advanced Technology Materials, Inc., Danbury, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 09/552,347

(22) Filed: Apr. 19, 2000

Related U.S. Application Data

(63) Continuation-in-part of application No. 09/300,994, filed on Apr. 28, 1999, now Pat. No. 6,089,027, which is a continuation-in-part of application No. 09/067,393, filed on Apr. 28, 1998.

(51) Int. Cl.[7] ............................. F17C 11/00; F17C 9/02; B67D 5/00
(52) U.S. Cl. .......................................... 62/46.1; 62/48.1
(58) Field of Search ................................ 62/46.1, 48.1, 62/45.1, 49.1, 51.1; 222/3

(56) References Cited

U.S. PATENT DOCUMENTS

| | | |
|---|---|---|
| 1,659,263 A | 2/1928 | Harris |
| 1,679,826 A | 8/1928 | Jenkins |
| 2,047,339 A | 7/1936 | Thomas |
| 2,354,283 A | 7/1944 | St. Clair |
| 2,502,588 A | 4/1950 | Preston et al. ............... 62/48.1 |
| 2,553,486 A | 5/1951 | Thomas ....................... 62/48.1 |
| 2,615,287 A | 10/1952 | Senesky |
| 2,707,484 A | 5/1955 | Rush ........................... 62/48.1 |
| 2,793,504 A | 5/1957 | Webster |
| 3,388,962 A | 6/1968 | Baumann et al. |
| 3,590,860 A | 7/1971 | Stenner |
| 3,699,998 A | 10/1972 | Baranowski, Jr. |
| 3,791,412 A | 2/1974 | Mays |
| 3,972,346 A | 8/1976 | Wormser |
| 3,994,674 A | 11/1976 | Baumann et al. |
| 4,173,986 A | 11/1979 | Martin |
| 4,485,739 A | 12/1984 | Emmett ....................... 102/200 |
| 4,624,443 A | 11/1986 | Eidsmore ..................... 251/65 |
| 4,694,860 A | 9/1987 | Eidsmore .............. 137/614.21 |
| 4,744,221 A | 5/1988 | Knollmueller ................ 62/48 |
| 4,793,379 A | 12/1988 | Eidsmore |
| 4,836,242 A | 6/1989 | Coffre et al. |

(List continued on next page.)

OTHER PUBLICATIONS

ANSI/CGA V–1–1994 American National/Compressed Gas Association, Standard for Compressed Gas Cylinder Valve Outlet and Inlet Connections, Compressed Gas Assoc., Inc.

Integrated Flow Systems Inc., SR4 and SR3 Series Regulators with Operation and Features, 1700 Granite Creek Road, Santa Cruz, CA 95065.

*Primary Examiner*—William C. Doerrler
(74) *Attorney, Agent, or Firm*—Robert A. McLauchlan, III; Steven J. Hultquist

(57) ABSTRACT

A gas storage and dispensing system comprising a vessel for holding a gas at a desired pressure. The vessel has a gas pressure regulator in its interior volume, to maintain pressure of dispensed gas at a desired pressure determined by the set point of the regulator. A second gas pressure regulator may be joined in series gas flow communication with the first gas pressure regulator, with the second gas pressure regulator being in initial contact with gas that is dispensed prior to its flow through the first gas pressure regulator, and with the set point pressure of the second gas pressure regulator being at least twice the set point pressure of the first gas pressure regulator.

20 Claims, 4 Drawing Sheets

U.S. PATENT DOCUMENTS

| | | |
|---|---|---|
| 5,230,359 A | 7/1993 | Ollivier |
| 5,233,837 A | 8/1993 | Callahan .................. 62/606 |
| 5,289,690 A | 3/1994 | Rockenfeller et al. ......... 62/77 |
| 5,303,734 A | 4/1994 | Eidsmore ............... 337/305.43 |
| 5,409,526 A | 4/1995 | Zheng et al. |
| 5,518,528 A | 5/1996 | Tom et al. |
| 5,547,229 A | 8/1996 | Eidsmore ................... 285/93 |
| 5,566,713 A | 10/1996 | Lhomer et al. |
| 5,595,209 A | 1/1997 | Atkinson et al. ......... 137/116.5 |
| 5,645,192 A | 7/1997 | Amidzich |
| 5,673,562 A | 10/1997 | Friedt ..................... 62/48.1 |
| 5,678,602 A | 10/1997 | Cannet et al. |
| 5,685,159 A | 11/1997 | Kooy et al. ................ 62/50.1 |
| 5,692,381 A | 12/1997 | Garrett ..................... 62/60 |
| 5,694,975 A | 12/1997 | Eidsmore ................ 137/489.5 |
| 5,752,544 A | 5/1998 | Yves ....................... 137/461 |
| 5,762,086 A | 6/1998 | Ollivier ..................... 137/1 |
| 5,901,557 A | 5/1999 | Grayson .................. 62/45.1 |
| 5,937,895 A | 8/1999 | LeFebre et al. |
| 6,007,609 A | 12/1999 | Semerdjiian et al. |
| 6,089,027 A * | 7/2000 | Wang et al. ............... 62/46.1 |
| 6,101,816 A * | 8/2000 | Wang et al. ............... 62/48.1 |

\* cited by examiner

GAS STORAGE AND DISPENSING SYSTEM COMPRISING REGULATOR INTERIORLY DISPOSED IN FLUID CONTAINMENT VESSEL AND ADJUSTABLE IN SITU THEREIN

CROSS-REFERENCE TO RELATED APPLICATIONS

This is a continuation-in-part U.S. patent application Ser. No. 09/300,994 filed Apr. 28, 1999 now U.S. Pat. No. 6,089,027 in the names of Luping Wanf and Glenn M. Tom for "FLUID STORAGE AND GAS DISPENSING SYSTEM," which is a continuation-in-part of U.S. patent application Ser. No. 09/067,393 filed Apr. 28, 1998 in the names of Luping Wang and Glenn M. Tom for "FLUID STORAGE AND GAS DISPENSING SYSTEM."

BACKGROUND OF THE INVENTION

1. Field of the Invention

This invention relates to a pressurized gas storage and gas dispensing system, useful in an applications such as manufacturing semiconductor materials and devices.

2. Description of the Related Art

In a wide variety of industrial processes and applications, there is a need for a reliable source of process gas(es).

Such process and application areas include semiconductor manufacturing, ion implantation, manufacture of flat panel displays, medical intervention and therapy, water treatment, emergency breathing equipment, welding operations, space-based delivery of liquids and gases, etc.

The present invention provides such a reliable source of gas having particular suitability for use in semiconductor manufacturing facilities to provide on-demand supply of gases, such as halocompound gases (e.g., $BF_3$, $F_2$, etc.), hydride gases (e.g., arsine, phosphine, etc.) and gaseous organometallic source reagents.

Art in the field of gas storage and dispensing systems includes the apparatus and methods described in the following U.S. patents:

U.S. Pat. No. 4,744,221 issued May 17, 1988 to Karl O. Knollmueller (storage and dispensing of arsine, sorptively stored on a 5–15 Angstrom pore size zeolite and dispensed by heating the zeolite to elevated temperature to desorb the arsine);

U.S. Pat. No. 5,518,528 issued May 21, 1996 in the names of Glenn M. Tom and James V. McManus (gas storage and dispensing system for gas sorptively held on a physical sorbent medium at low pressure, and dispensed by pressure differential-mediated desorption of gas from the sorbent medium);

U.S. Pat. No. 5,937,895 issued Aug. 17, 1999 in the names of David A. LeFebre and Thomas B. Martin, Jr. and U.S. Pat. No. 6,007,609 issued Dec. 28, 1999 in the names of Roy V. Semerdjian, David A. LeFebre and Thomas B. Martin, Jr. (pressurized vessel with regulator in the form of a dispensing check valve and a capillary tube flow restriction arrangement for fluid dispensing);

prior copending U.S. patent application Ser. No. 09/067,393 filed Apr. 28, 1998 in the names of Luping Wang and Glenn M. Tom and prior copending U.S. patent application Ser. No. 09/300,994 filed Apr. 28, 1999 in the names of Luping Wang and Glenn M. Tom (fluid storage and gas dispensing system including a storage and dispensing vessel having a fluid pressure regulator arranged so that fluid dispensed from the vessel flows through the regulator to downstream flow control means);

U.S. Pat. No. 3,590,860 to Stenner (a manually adjustable regulator valve for a liquid propane cartridge, including a regulator diaphragm and actuating spring assembly);

U.S. Pat. No. 4,836,242 to Coffre et al. (a pressure reducer for supplying electronic grade gas, including a bellows and inlet valve, with a solid particles filter disposed between the bellows and a low pressure outlet);

U.S. Pat. No. 5,230,359 to Ollivier (a diaphragm-based pressure regulator for a high pressure gas cylinder, wherein a valve is positioned in the regulator for adjustably throttling the flow of pressurized fluid);

U.S. Pat. No. 3,699,998 to Baranowski, Jr. (a calibratable pressure regulator in which leaf spring fasteners are utilized to retain the regulator components in position);

U.S. Pat. No. 3,791,412 to Mays (a pressure reducing valve for high pressure gas containers, including a pair of valve elements for dispensing low pressure throttled fluid);

U.S. Pat. No. 3,972,346 to Wormser (pressure regulator featuring a U-ring seal poppet assembly);

U.S. Pat. No. 4,793,379 to Eidsmore (button-operated valve for main shut-off and flow control of a pressurized gas cylinder, using magnetic actuation of valve components);

U.S. Pat. No. 2,615,287 to Senesky (a gas pressure regulator including diaphragm and diaphragm-clamping member elements);

U.S. Pat. No. 4,173,986 to Martin (pressurized gas flow control valve including pressure regulator and responsive poppet valve structure);

U.S. Pat. No. 3,388,962 to Baumann et al. (pressurized gas fuel metering device including sintered metal pellet flow element);

U.S. Pat. No. 1,679,826 to Jenkins (fluid pressure regulator for high pressure container, utilizing diaphragm element and gas filtering means comprising a felt strip);

U.S. Pat. No. 2,354,283 to St. Clair (fluid pressure regulator for liquefied petroleum gas tanks, comprising pressure actuated diaphragm with flow restrictor structure to minimize vibration);

U.S. Pat. No. 5,566,713 to Lhomer et al. (gas flow control dispensing assembly including piston-type pressure regulator and block reducer/regulator means);

U.S. Pat. No. 5,645,192 to Amidzich (valve assembly for relieving excess gas pressure in a container, comprising sealing ring/spring assembly);

U.S. Pat. No. 5,678,602 to Cannet et al. (gas control and dispensing assembly for a pressurized gas tank, including reducer and regulator means with indexed flowmeter valve);

U.S. Pat. No. 2,793,504 to Webster (valve for pressurized fluid container including pressure reducer and regulator and spring bias closure means);

U.S. Pat. No. 1,659,263 to Harris (regulator for pressurized gas cylinder including a diaphragm and anti-friction washer between diaphragm and annular seat of regulator);

U.S. Pat. No. 2,047,339 to Thomas (liquefied petroleum gas storage apparatus including flow control unit and leakage prevention valve); and U.S. Pat. No. 3,994,674 to Baumann et al. (detachable burner assembly for container of pressurized liquefied combustible gas, including a regulator valve assembly).

SUMMARY OF THE INVENTION

The present invention relates to a system for storage and dispensing of a pressurized gas, for use in applications such as manufacturing semiconductor products.

In one aspect, the present invention relates to a fluid storage and dispensing system, comprising:
- a gas storage and dispensing vessel enclosing an interior volume for holding pressurized gas, wherein the vessel includes a port;
- a valve head mounted in the vessel port;
- a gas dispensing assembly coupled in gas flow communication with the valve head;
- a gas pressure regulator in the interior volume of the vessel, positioned below the valve head and arranged to maintain a predetermined pressure of gas discharged from the vessel;
- the gas dispensing assembly being selectively actuatable to flow gas from the interior volume of the vessel, through the gas pressure regulator, the valve head and the gas dispensing assembly, for discharge of the gas from the vessel.

In one aspect of such system, the aforementioned gas pressure regulator is a first gas pressure regulator, and the system further includes a second gas pressure regulator in the interior volume of the vessel, joined in series relationship with the first gas pressure regulator.

In a specific embodiment of such two-regulator array, the first gas pressure regulator is joined at a discharge end thereof to a first particulate filter and the second gas pressure regulator is joined at its inlet end to a second particulate filter.

Another specific embodiment of such two-regulator arrangement includes the first particulate filter, first gas pressure regulator, second gas pressure regulator and second particulate filter being in coaxial alignment with one another in the interior volume of the vessel.

Other aspects, features and embodiments in the invention will be more fully apparent from the ensuing disclosure and appended claims.

DETAILED DESCRIPTION OF THE INVENTION, AND PREFERRED EMBODIMENTS THEREOF

Figure 1:
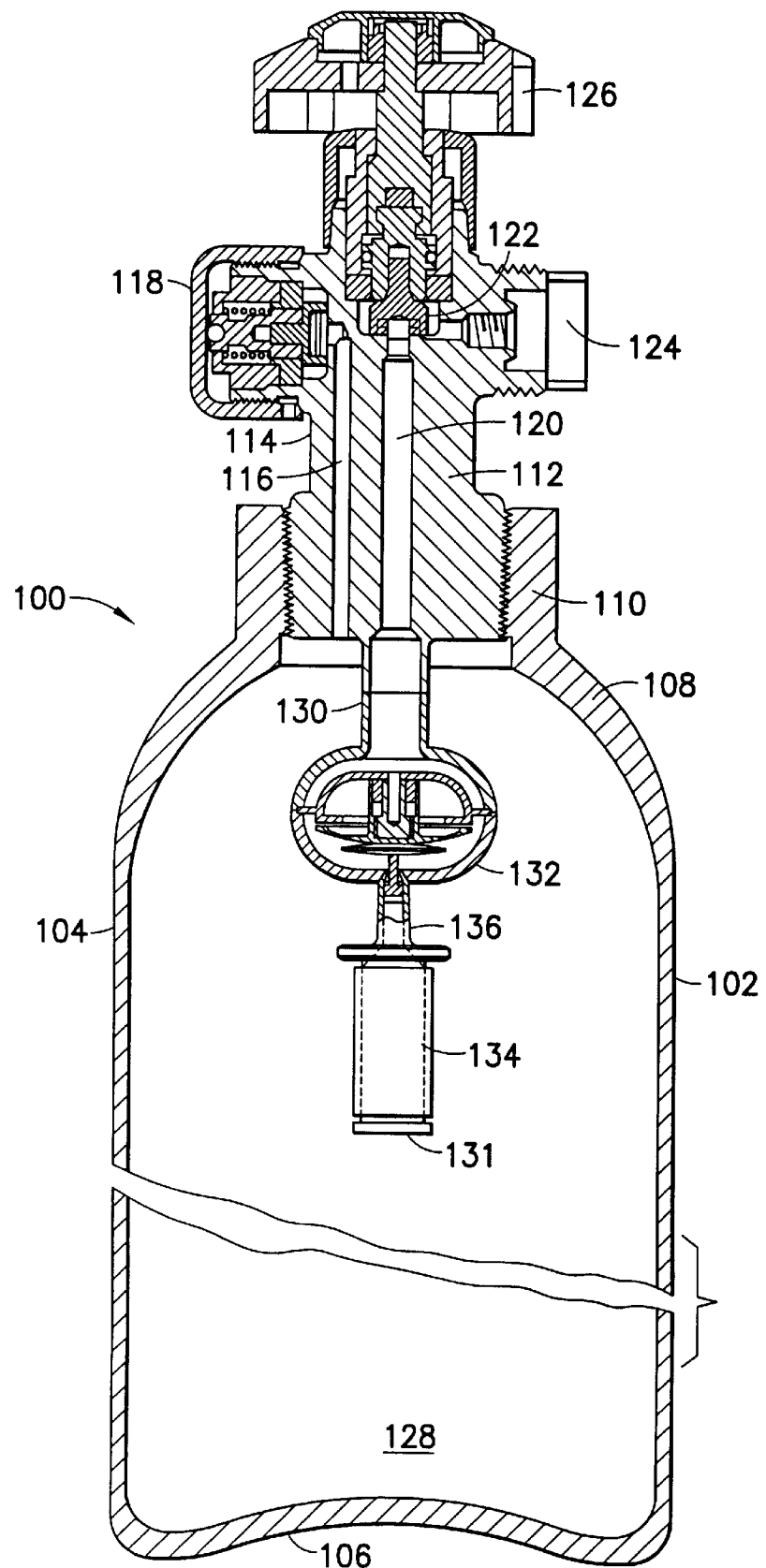
FIG. 1 is a schematic cross-sectional elevation view of a gas storage and dispensing system according to one embodiment of the present invention.

The disclosures of the following U.S. Patent Applications are hereby incorporated herein by reference: U.S. patent application Ser. No. 09/300,994 filed Apr. 28, 1999 in the names of Luping Wang and Glenn M. Tom for "FLUID STORAGE AND GAS DISPENSING SYSTEM," and U.S. patent application Ser. No. 09/067,393 filed Apr. 28, 1998 in the names of Luping Wang and Glenn M. Tom for "FLUID STORAGE AND GAS DISPENSING SYSTEM."

The present invention relates to a gas storage and dispensing system having one or more gas pressure regulators internally contained in a vessel holding pressurized gas.

In such arrangement, the regulator (or multiple regulator assembly) is disposed between a confined pressurized gas volume and a gas dispensing assembly. The gas dispensing assembly can be variously configured, e.g., including a gas flow control element such as a gas flow shut off valve, mass flow controller, or the like.

By positioning of the regulator inside the gas storage and dispensing vessel, the regulator is protected by the vessel from impact, environmental exposure and damage. Additionally, the regulator acts as a safety containment element for the high-pressure gas, in that the regulator is set at a significantly lower pressure set point so that gas dispensed from the vessel is at pressure well below that of the bulk volume of pressurized gas in the vessel.

The gas pressure regulator devices useful in the broad practice of the invention can be of any suitable type. Preferred regulators include the Swagelok® HF series of set pressure regulators (commercially available from Swagelok Company, www.swagelok.com), having a set point pressure in a range of from vacuum levels to pressures on the order of 2550 psig. The use of high-precision regulators permits gas to be reliably dispensed from the vessel containing the interior regulator, at the desired set point pressure level.

The gas pressure regulator in general is advantageously of a poppet valve type, comprising a poppet element that is biased to a seat structure to prevent flow at a pressure above the set point value. Such regulator uses a gas-actuated pressure-sensing, assembly that accommodates changes in outlet pressure by responsive expansion/contraction of the pressure-sensing assembly and translation of the poppet, to maintain the set point pressure.

The gas pressure regulator thus is set to an appropriate level, e.g., 700 Torr, to provide flow of gas from the gas storage and dispensing vessel at such set point pressure level, when the dispensing assembly associated with the gas vessel is opened to flow, by opening a flow control valve of the dispensing assembly or in other appropriate manner.

The dispensing assembly associated with the vessel defines a flow circuit, which may for example comprise an extended length ("run") of conduit, or a manifold to which the gas vessel is coupled for the dispensing operation. The flow circuit may include suitable instrumentation and control means, to monitor the gas dispensing operation, to effect switchover between multiple gas vessels coupled to the flow circuit (e.g., in a multi-vessel manifold arrangement), and/or to provide for cyclic or intermittent operation to accommodate a downstream gas-consuming facility being supplied with gas from the vessel.

The gas contained in the gas storage and dispensing vessel of the invention may comprise any suitable gas, such as for example a hydride gas for semiconductor manufacturing operations. Examples of hydride gases of such type include arsine, phosphine, stibine, silane, chlorosilane, and diborane. Other gases useful in semiconductor manufacturing operations may be employed, including acid gases such as hydrogen fluoride, boron trichloride, boron trifluoride, hydrogen chloride, halogenated silanes (e.g., $SiF_4$) and disilanes (e.g., $Si_2F_6$), etc., having utility in semiconductor manufacturing operations as halide etchants, cleaning agents, source reagents, etc. Other reagents include gaseous organometallic reagents used as precursors for metalorganic chemical vapor deposition (MOCVD).

Referring now to the drawings, FIG. 1 is a schematic cross-sectional elevation view of one gas storage and dispensing system 100 according to an illustrative embodiment of the invention. The system 100 includes a fluid storage and dispensing vessel 102 of generally cylindrical form, with a cylindrical sidewall 104 closed at its lower end by floor member 106. At the upper end of the vessel is a neck 108 including a cylindrical collar 1 10 defining and circumscribing a top opening (port) of the vessel. The vessel wall, floor member and neck thereby enclose an interior volume 128, as shown.

At the neck of the vessel, a threaded plug 112 of the valve head assembly 114 is threadably engaged with the interior threaded opening of the collar 110. The valve head assembly 114 includes a central fluid flow passage 120 joined in fluid flow communication with a central working volume cavity in the valve head assembly. The central working volume cavity in turn is joined to outlet 124, which may be exteriorly threaded or otherwise constructed for attachment of a connector and associated piping, conduit, etc. thereto.

Disposed in the central working volume cavity is a valve element 122 that is joined to a hand wheel 126 in the embodiment shown, but may alternatively be joined to an automatic valve actuator or other controller or actuating means.

The valve head assembly 114 also features in the valve block a fill passage 116 communicating with fill port 118 and the interior volume 128 of the vessel. The vessel 102 may thereby be charged with pressurized gas, following which the fill port is closed and capped, as shown.

The central fluid flow passage 120 in the valve head assembly 114 is joined at its lower end to a connector flow tube 130, to which in turn is joined to the regulator 132. The regulator is set to maintain a selected pressure of the fluid discharged from the vessel.

At the lower end of the regulator is joined a tubular fitting 136 which in turn is joined, e.g., by butt welding, to a filter unit 134 having a diffuser end cap 131 at its lower extremity. The filter unit may be formed of stainless steel, with the diffuser wall being formed of a sintered stainless steel such as 316L stainless steel. The filter unit has a wall porosity that permits removal of all particles greater than a predetermined diameter, e.g., greater than 0.003 micrometers at 30 standard liters per minute flow rate of gas from the system. Filter units of such type are commercially available from Mott Corporation (Farmington, Conn.).

In use, a pressurized gas is contained in the interior volume 128 of the vessel 102. The gas pressure regulator 132 is set to a selected set point to provide flow of dispensed gas when the valve in the valve head assembly 114 is opened, with the gas flowing through the filter unit 134, fitting 136, regulator 132, connector flow tube 130, central fluid flow passage 120 in the valve head assembly 114, the central working volume cavity, and outlet 124. The valve head assembly may be joined to other piping, conduits, flow controllers, monitoring means, etc. as may be desirable or required in a given end use application of the invention.

Figure 2:
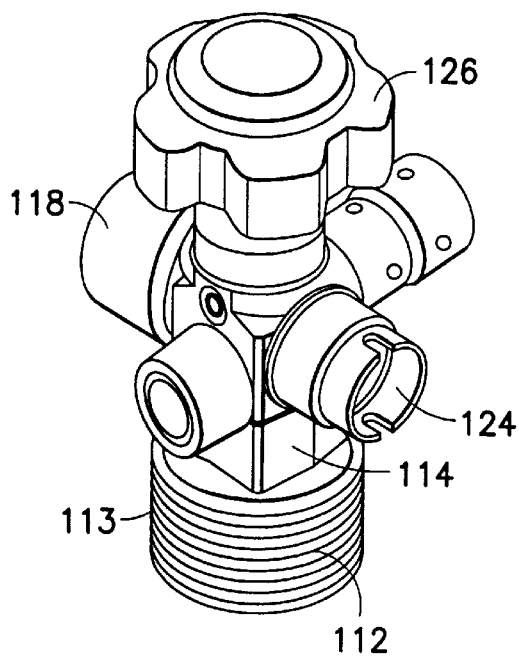
FIG. 2 is a perspective view of the valve head assembly of the FIG. 1 gas storage and dispensing system.

FIG. 2 is a perspective view of the valve head assembly 114 of the FIG. 1 fluid storage and dispensing system. In FIG. 2, wherein corresponding elements are correspondingly numbered to FIG. 1, the plug 112 is shown as being provided with threading 113 complementary to threading on the inner surface of the collar 110, whereby the plug of the valve head assembly and the vessel may be matably engaged with one another in a leak-tight fashion.

Figure 3:
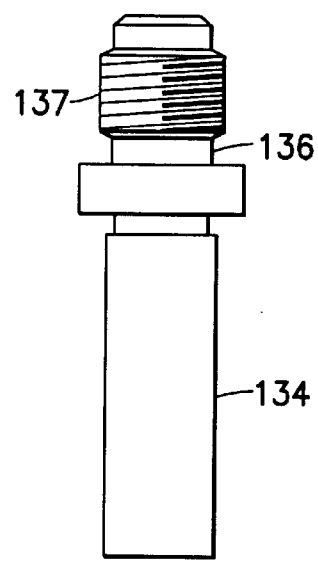
FIG. 3 is an elevation view of the filter unit employed in the FIG. 1 gas storage and dispensing system.

FIG. 3 is an elevation view of the filter unit 134 employed in the FIG. 1 fluid storage and dispensing system 100. The filter unit 134 as shown has a tubular fitting portion that is threaded with threading 137, for matable engagement with the housing of the regulator 132 shown in FIG. 1.

Figure 4:
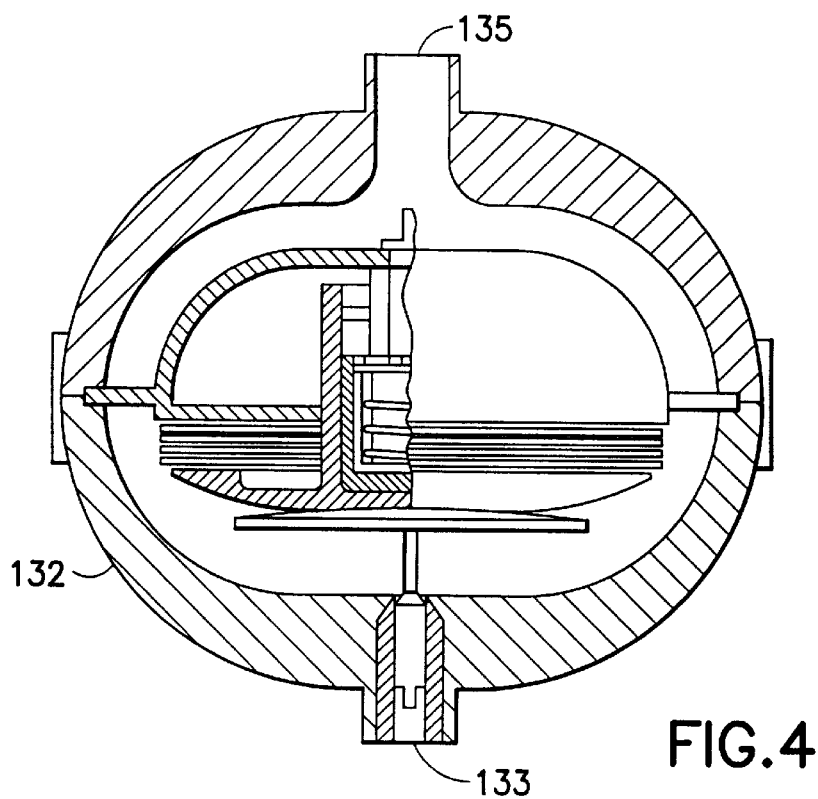
FIG. 4 is a partially broken away view of the regulator of the FIG. 1 gas storage and dispensing system.

FIG. 4 is a partially broken away view of the regulator 132 of the FIG. 1 gas storage and dispensing system 100. The regulator 132 as illustrated has a lower gas inlet 133, to which the tubular fitting of the filter unit is threadably joined. The regulator 132 at its upper end is provided with a gas outlet 135 that is joined to connector flow tube 130 as shown in FIG. 1.

Figure 5:
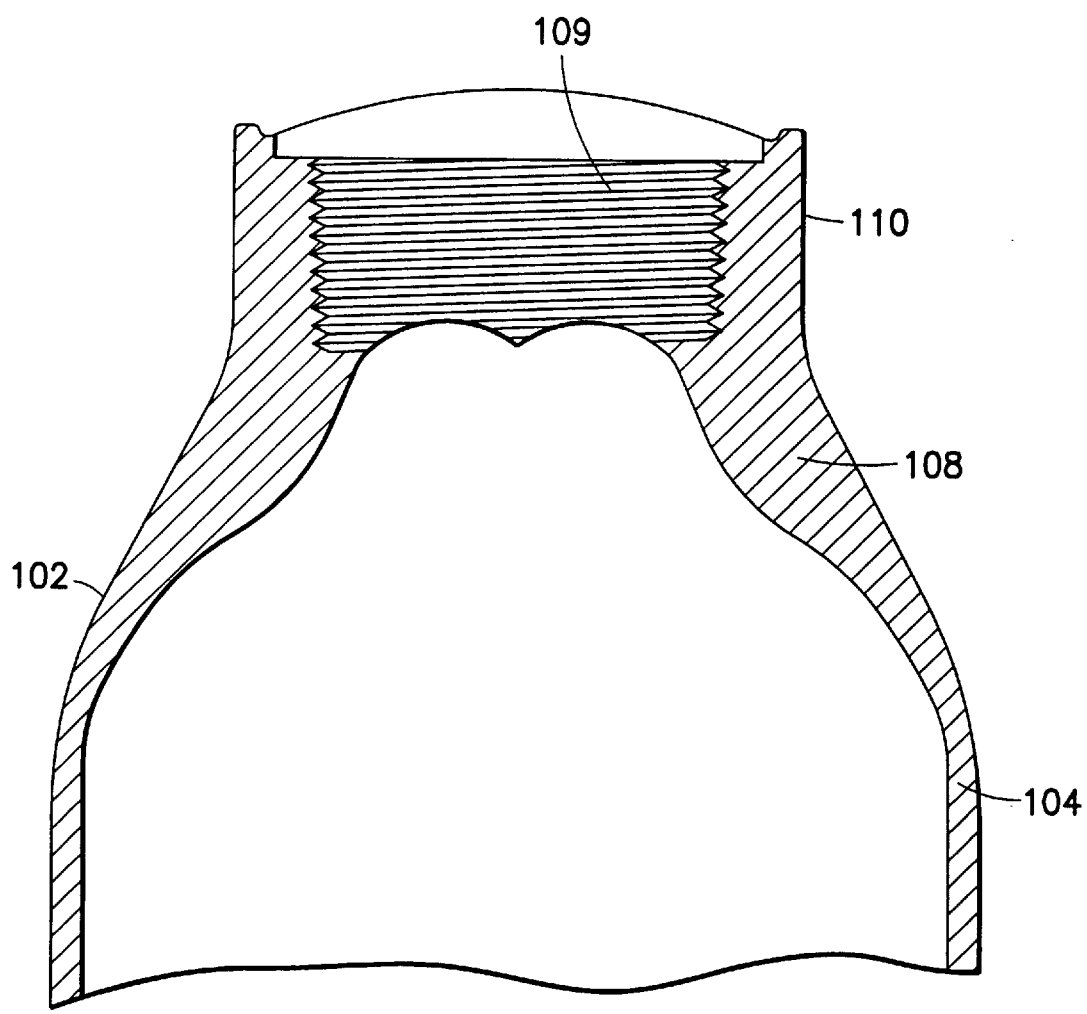
FIG. 5 is a sectional elevation view of an upper section of the gas storage and dispensing vessel of the FIG. 1 gas storage and dispensing system.

FIG. 5 is a sectional elevation view of an upper section of the gas storage and dispensing vessel 102 of the FIG. 1 gas storage and dispensing system 100. The illustrated portion of the vessel 102 includes the cylindrical wall 104, neck 108 and collar 110. The interior surface of the collar is threaded with threading 109 that is complementary to the threading 113 on the plug 112 of the valve head assembly 114. The vessel may be formed of a stainless steel material or other ferrous metal alloy, or other metal or non-metal material of construction, providing a>1 inch NGT neck opening and appropriate NGT threading.

Figure 6:
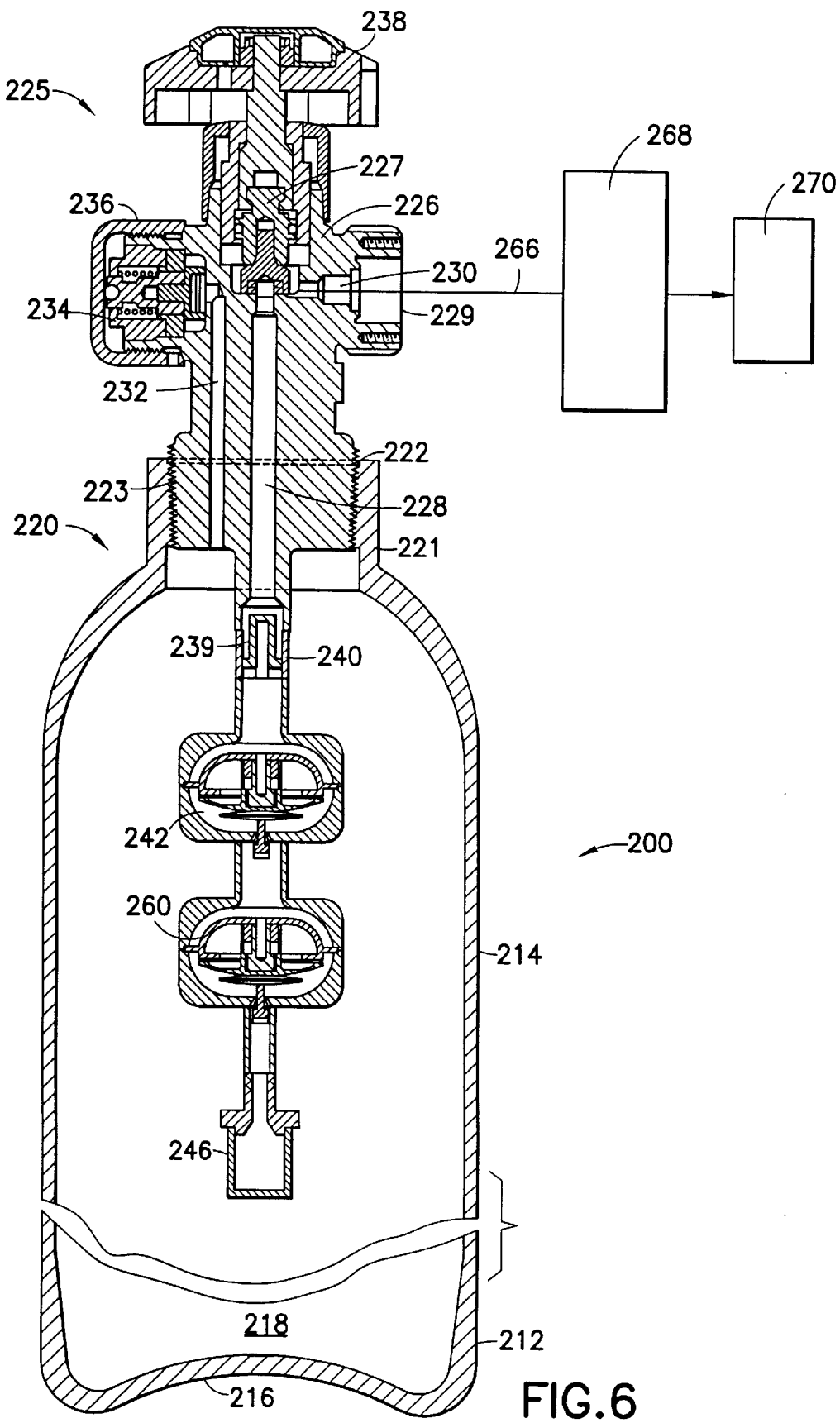
FIG. 6 is a schematic cross-sectional elevation view of a gas storage and dispensing system according to another embodiment of the present invention.

FIG. 6 is a schematic cross-sectional elevation view of a gas storage and dispensing system 200 according to another embodiment of the present invention. The gas storage and dispensing system 200 includes a gas storage and dispensing vessel 212 comprising a cylindrical sidewall 214 and a floor 216 corporately enclosing the interior volume 218 of the vessel. The side wall and floor may be formed of any suitable material of construction, e.g., metal, gas-impermeable plastic, fiber-resin composite material, etc., as appropriate to the gas to be contained in the vessel, the end use environment of the apparatus, and the pressure levels to be maintained in the vessel in storage and dispensing use.

At its upper end 220, the vessel features a neck 221 defining a port opening 222 bounded by the inner wall 223 of the neck 221. The inner wall 223 may be threaded or otherwise complementarily configured to matably engage therein a valve head 225 including valve body 226 that may be complementarily threaded or otherwise configured for such engagement.

In such manner, the valve head 225 is engaged with the vessel 212 in a leak-tight manner, to hold gas therein in the interior volume 218 at the desired storage conditions.

The valve head body 226 is formed with a central vertical passage 228 therein for dispensing of gas deriving from fluid in the vessel 212. The central vertical passage 228 communicates with the gas discharge passage 230 of gas discharge port 229, as shown.

The valve head body contains a valve element 227 that is coupled with the hand wheel 238, for selective manual opening or closing of the valve. In this fashion, the hand wheel may be opened to flow gas through the central vertical passage 228 to the gas discharge port 229, or alternatively the hand wheel may be manually closed, to terminate flow of gas from the central vertical passage 228 to the gas discharge port 229 during the dispensing operation.

The valve element 227 is therefore arranged downstream of the regulator, so that fluid dispensed from the vessel flows through the regulator prior to flow through the flow control valve comprising valve element 227.

In place of the hand wheel valve actuation element, there may be provided an automatic valve actuator, such as a pneumatic valve actuator, an electromechanical valve actuator, or other suitable means for automatically opening and closing the valve in the valve head.

The valve head body 226 also contains a fill passage 232 formed therein to communicate at its upper end with a fill port 234. The fill port 234 is shown in the FIG. 6 drawing as capped by fill port cap 236, to protect the fill port from contamination or damage when the vessel has been filled and placed into use for the storage and dispensing of gas from the contained fluid.

The fill passage at its lower end exits the valve head body 226 at a bottom surface thereof as shown. When the fill port 234 is coupled with a source of the gas to be contained in the vessel, the gas can flow through the fill passage and into the interior volume 218 of the vessel 212.

Joined to the lower end of valve head body 226 is an extension tube 240., containing a first particle filter 239 therein. First regulator 242 is mounted on the end of the extension tube 240. The first regulator 242 is secured to the extension tube lower end in any suitable manner, as for example by providing internal threading in the lower end portion of the extension tube, with which the regulator 242 is threadably enagageable.

Alternatively, the first regulator may be joined to the lower end of the extension tube by being bonded thereto, e.g., by welding, brazing, soldering, melt-bonding, or by suitable mechanical joining means and/or methods, etc.

The first regulator 242 is arranged in series relationship with a second regulator 260, as shown. For such purpose, the first and second regulators may be threadably engageable with one another, by complementary threading comprising threading on the lower extension portion of the first regulator 242, and threading that is matably engageable therewith on the upper extension portion of the second regulator 260.

Alternatively, the first and second regulators may be joined to one another in any suitable manner, as for example by coupling or fitting means, by adhesive bonding, welding, brazing, soldering, etc., or the first and second regulators may be integrally constructed as components of a dual regulator assembly.

At its lower end, the second regulator 260 is joined to high efficiency particle filter 246.

The high efficiency particle filter 246 serves to prevent contamination of the regulator elements and upstream valve element 227 with particulates or other contaminating species that otherwise may be present in the fluid flowed through the regulators and valves in the operation of the apparatus.

The embodiment shown in FIG. 6 also has a high efficiency particle filter 239 disposed in the extension tube 240, to provide further particulate removal capability, and to ensure high gas purity of the dispensed gas.

Preferably, the regulator has at least one particle filter in series flow relationship with it. Preferably, as shown in the FIG. 6 embodiment, the system includes a particle filter upstream of the regulator(s), as well as a particle filter downstream of the regulator(s), in the gas flow path from the vessel interior volume 218 to the gas discharge port 229.

The valve head 225 in the FIG. 6 embodiment thus provides a two-port valve head assembly—one port is the gas fill port 234, and another port is the gas discharge port 229.

The pressure regulator is of a type including a diaphragm element coupled with a poppet-retaining wafer. The wafer in turn is connected to the stem of a poppet element, as part of a pressure sensing assembly that precisely controls outlet gas pressure. A slight increase in outlet pressure causes the pressure sensing assembly to contract, and a slight increase in the outlet pressure causes the pressure sensing assembly to expand The contraction or expansion serves to translate the poppet element to provide precise pressure control. The pressure sensing assembly has a set point that is pre-established or set for the given application of the gas storage and dispensing system.

As illustrated, a gas discharge line 266, containing a flow control valve 268 therein, is coupled with the discharge port 229. By this arrangement, the flow control valve in the gas discharge line is opened to flow gas from the vessel 212 to the associated process facility 270 (e.g., a semiconductor manufacturing facility or other use facility), in the dispensing mode of the fluid storage and dispensing system 210.

The gas dispensed in such manner will be at a pressure determined by the set point of the regulator 242.

The respective set points of the regulator 260 and the regulator 242 in the FIG. 6 embodiment may be selected or preset at any suitable values to accommodate a specific desired end use application.

For example, the second or "upstream" regulator 260 may have a set point that is in a range of from about 20 psig to about 2500 psig. The first or "downstream" regulator 242 may have a set point that is above the pressure set point of the upstream regulator 260, e.g., in a range of from about 1 torr up to 2500 psig.

In one illustrative embodiment, the upstream regulator 260 has a set point pressure value that is in the range of from about 100 psig to about 1500 psig, while the downstream regulator 242 has a set point pressure value in the range of from about 100 torr to about 50 psig, wherein the upstream pressure set point is above the set point of the downstream regulator.

Although the set points of the regulators in a serial regulator assembly may be established in any suitable ratio in relation to one another, in a two-regulator assembly such as shown in FIG. 6, the upstream regulator in preferred practice advantageously has a pressure set point that is at least twice the set point value (measured in the same pressure units of measurement) of the downstream regulator.

In the FIG. 6 embodiment, the first and second regulators are coaxially aligned with one another to form a regulator assembly having the particulate filters on either end. As a consequence of such arrangement, the gas dispensed from the vessel 212 is of extremely high purity.

As a further modification, the particulate filters may be coated or impregnated with a chemisorbent that is selective for impurity species present in the gas to be dispensed (e.g., decomposition products deriving from reaction or degradation of the gas in the vessel). In this manner, the gas flowing through the particulate filter is purified in situ along the flow path as it is dispensed.

In one illustrative embodiment of a gas storage and dispensing system of the type shown in FIG. 6, the vessel 212 is a 3AA 2015 DOT 2.2 liter cylinder. The high efficiency particle filter 246 is a GasShield™ PENTA™ point-of-use gas filter, commercially available from Mott Corporation (Farmington, Conn.), having a sintered metal filtration medium in a housing of 316L VAR/electropolished stainless steel or nickel capable of greater than 99.9999999% removal of particles down to 0.003 micron diameter. The high efficiency particle filter 239 is a Mott standard 6610-¼ in-line filter, commercially available from Mott Corporation (Farmington, Conn.). The regulators are HF series Swagelo® pressure regulators, with the first regulator 242 having a set point pressure in the range of from 100 Torr to 50 psig, and the second regulator 260 having a set point pressure in the range of from 100 psig to 1500 psig, with the set point pressure of the second regulator 260 being at least twice the set point pressure of the first regulator 242.

While the invention has been illustratively described herein with reference to specific elements, features and embodiments, it will be recognized that the invention is not thus limited in structure or operation, but that the invention is to be broadly construed consistent with the disclosure herein, as comprehending variations, modifications and embodiments as will readily suggest themselves to those of ordinary skill in the art.

What is claimed is:

1. A gas storage and dispensing system, comprising:
    a gas storage and dispensing vessel enclosing an interior volume for holding pressurized gas, wherein the vessel includes a port;
    a valve head mounted in the vessel port;
    a gas dispensing assembly coupled in gas flow communication with the valve head;
    a gas pressure regulator in the interior volume of the vessel, positioned below the valve head and arranged to maintain a predetermined pressure of gas discharged from the vessel;
    the gas dispensing assembly being selectively actuatable to flow gas from the interior volume of the vessel, through the gas pressure regulator, the valve head and the gas dispensing assembly, for discharge of the gas from the vessel.

2. A system according to claim 1, further comprising a particulate filter between the valve head and the gas pressure regulator.

3. A system according to claim 1, wherein the dispensing assembly includes a flow control valve operatively coupled with a valve actuator therefor, and an automatic controller for actuating the valve actuator to initiate adjustment of the valve for controlled discharge flow of gas deriving from fluid in the vessel.

4. A system according to claim 1, further comprising gas contained in the vessel interior volume selected from the group consisting of hydride gases, halide gases and gaseous organometallics.

5. A system according to claim 1, further comprising gas contained in the vessel interior volume selected from the group consisting of arsine, phosphine, stibine, silane, diborane, hydrogen fluoride, boron trichloride, boron trifluoride, hydrogen chloride, halogenated silanes and disilanes.

6. A system according to claim 1, further comprising a gas contained in the vessel interior volume selected from the group consisting of arsine, boron trichloride and boron trifluoride.

7. A system according to claim 1, wherein said gas pressure regulator is a first gas pressure regulator, and further comprising a second gas pressure regulator joined in series relationship with the first gas pressure regulator.

8. A system according to claim 7, wherein the first gas pressure regulator has a set point pressure in the range of from about 1 Torr to about 2550 psig.

9. A system according to claim 7, wherein the second gas pressure regulator has a set point pressure in the range of from about 20 psig to about 2550 psig.

10. A system according to claim 7, wherein the second gas pressure regulator has a set point pressure that above the set point pressure of the first gas pressure regulator.

11. A system according to claim 7, wherein the second gas pressure regulator has a set point pressure that is at least twice the set point pressure of the first gas pressure regulator.

12. A system according to claim 7, wherein the second gas pressure regulator is vertically coaxially aligned with the first gas pressure regulator.

13. A system according to claim 7, wherein the second gas pressure regulator is joined at its inlet end to a particulate filter.

14. A system according to claim 7, wherein the first gas pressure regulator is joined at a discharge end thereof to a first particulate filter and the second gas pressure regulator is joined at its inlet end to a second particulate filter.

15. A system according to claim 14, wherein the first particulate filter, first gas pressure regulator, second gas pressure regulator and second particulate filter are coaxially aligned with respect to one another.

16. A system according to claim 1, wherein the valve head comprises a two-port valve body.

17. A system according to claim 16, wherein the valve body at its lower portion inside the vessel is joined to an extension tube that downwardly extends from the valve body into the interior volume of the vessel, and at its lower end is joined to the gas pressure regulator.

18. A system according to claim 17, wherein the extension tube is coaxially aligned. with a discharge passage in the valve body, and said discharge passage is coupled in gas flow communication with the gas dispensing assembly.

19. A system according to claim 18, wherein the gas dispensing assembly comprises a flow control valve therein.

20. A system according to claim 1, wherein the gas dispensing assembly is joined in gas flow communication with a semiconductor manufacturing facility.

* * * * *